United States Patent [19]

Rice

[11] 4,261,614
[45] Apr. 14, 1981

[54] TELESCOPING CAMPER

[76] Inventor: James D. Rice, 18 Tennessee La., Auburndale, Fla. 33880

[21] Appl. No.: 32,565

[22] Filed: Apr. 23, 1979

[51] Int. Cl.³ .............................................. B60P 3/32
[52] U.S. Cl. .................................... 296/171; 254/276; 254/339; 74/89.22
[58] Field of Search ................ 296/171, 175, 165, 26, 296/27; 254/174, 173 R, 187.8, DIG. 15

[56] References Cited

U.S. PATENT DOCUMENTS

| | | | |
|---|---|---|---|
| 2,292,107 | 8/1942 | Doepke | 296/171 |
| 2,739,833 | 3/1956 | Schenkel et al. | 296/171 |
| 2,821,428 | 1/1958 | Webster | 296/175 |
| 2,944,852 | 7/1960 | Snyder | 296/171 |
| 2,951,460 | 9/1960 | Pierson | 254/173 R |
| 3,392,926 | 7/1968 | Adams | 254/173 R |
| 3,463,541 | 8/1969 | Garrison | 296/26 |
| 3,744,760 | 7/1973 | Uher | 254/187.8 |
| 3,850,470 | 11/1974 | Trelle | 296/175 |

FOREIGN PATENT DOCUMENTS

949133  4/1949  France ..................................... 296/171

Primary Examiner—John J. Love
Assistant Examiner—Ross Weaver
Attorney, Agent, or Firm—Duckworth, Hobby, Allen, Dyer & Pettis

[57] ABSTRACT

A telescoping vehicle body has a covered base frame having a telescoping frame telescoping thereover allowing the body to be lowered for travel. A lifting winch is attached to the base frame and has one or more cables connected thereto, which are connected through a plurality of rollers located on the base frame to the base frame. The cables also pass under rollers attached to the telescoping frame, so that pulling the cable taut will lift the telescoping frame, while loosening the cable will allow the telescoping frame to lower itself. Guides are provided for guiding and stabilizing the telescoping frame during raising and lowering.

20 Claims, 20 Drawing Figures

TELESCOPING CAMPER

BACKGROUND OF THE INVENTION

The present invention relates to camper and vehicle bodies and toppers for pickup trucks, and especially to a telescoping vehicle body which can be lowered for travel and raised to provide additional head room when occupied.

DESCRIPTION OF THE PRIOR ART

In the past, a wide variety of camper bodies have been provided for attaching to pickup trucks, and the like, to convert the truck to a more useful vehicle for camping or carrying equipment and supplies. These camper bodies are called toppers when they consist of no more than the tops and the sides for providing a cover to the open portion of the truck bed, and typically are finished on the inside to use for camping as well as to provide storage space for carpenters and other craftsmen. One problem with camper bodies is that they are generally too low to allow for standing in the truck bed, and if made higher, substantially increase weight and wind resistance when driving along the road. To overcome this, a wide variety of suggestions have been made for increasing the height of camper bodies to allow for standing room in the camper when in use, but to allow the body to telescope or collapse to a shorter size for travel. The present invention uses a telescoping body and reduces the weight of such body.

Typical prior art patents may be seen in the Remmert U.S. Pat. No. 3,506,300 for a telescoping trailer which uses cables driven by a hydraulic cylinder in which the cables are extended over pulleys and attached to the telescoping portion of the camper to lift the telescoping portion. A similar system can be seen in the Cornelius U.S. Pat. No. 3,021,170 for a telescoping cover for trucks in which a hand crank having a ratchet and pawl mechanism is used to pull ropes or cables over pulleys having the cable attached over one pulley and to the telescoping portion to lift the telescoping portion. The Litton U.S. Pat. No. 3,494,655 shows a trailer construction using cable lifting techniques and having guides for lifting a telescoping portion of a trailer, and the Mertz U.S. Pat. No. 4,012,070 shows a convertible camper vehicle having cable or rope lifting system for the camper body. One prior patent to Schenkel, et al., U.S. Pat. No. 2,739,833, shows a collapsible one and two story house trailer using chains, while Touchette, U.S. Pat. No. 3,734,559, uses cables to lift the telescoping body. Other telescoping type vehicle bodies can be seen in the Hall U.S. Pat. No. 3,652,119, the Ervine U.S. Pat. No. 2,893,780, and the Ratcliff U.S. Pat. No. 3,650,556. These prior art patents typically raise the telescoping portion using a hydraulic cylinder or a hand winch pulling on cords or cables or chains extending over pulleys mounted on the lower portion of the body and attached to the bottom of the telescoping portion to raise the telescoping portion. This typically requires four interconnected but independent cables, which require individual alignment.

The present invention, on the other hand, utilizes either one or two cables, which are not attached to the telescoping portion, but instead, extend over pairs of rollers on the base portion of the vehicle body with the cable between each pair of rollers passing beneath a roller attached to the telescoping portion with the end of the cable being attached to the base portion of the camper, whereby drawing the cable taut with a simplified electrical winch raises the telescoping portion of the body. Guides are used to align the telescoping body as it is raised or lowered, but the raising and lowering is simplified and alignment problems are reduced.

SUMMARY OF THE INVENTION

The present invention relates to a telescoping vehicle body such as for camper bodies for pickup trucks, or the like, which have a covered base frame having a bottom edge and a top edge. A telescoping frame telescopes over the base frame and also has bottom and top portions. Guides for guiding the telescoping frame as it is raised and lowered are connected to the base portion and to the telescoping portion, and a lifting winch is attached to the base frame and has cables attached thereto. A plurality of rollers are rotatably attached to the base frame top portion, while a plurality of second rollers are attached to the bottom portion of the telescoping frame, so that a cable may extend over the rollers attached to the base frame and under the rollers attached to the telescoping frame, and be fixedly attached at one end to the base frame, whereby, pulling the cables taut will lift or telescope the telescoping frame portion on the base frame portion.

BRIEF DESCRIPTION OF THE DRAWINGS

Other objects, features and advantages of the present invention will be apparent from the written description and the drawings, in which.

DESCRIPTION OF THE PREFERRED EMBODIMENT

Figure 1:
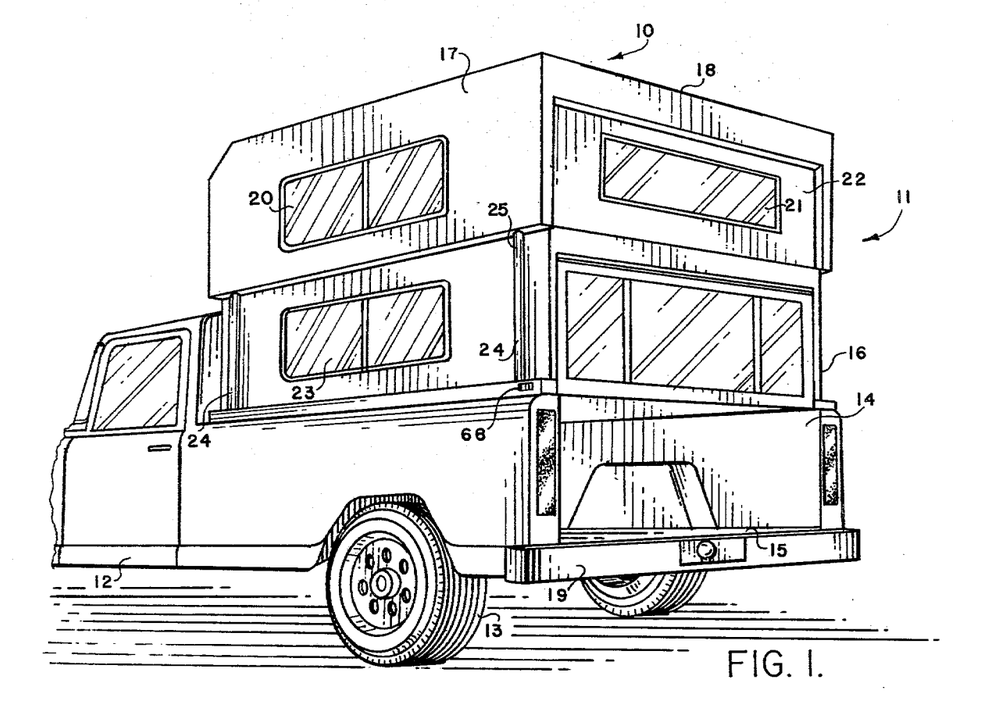
FIG. 1 is a perspective view of a telescoping topper body placed on a pickup truck in accordance with the present invention.

Referring now to the drawings, and especially to FIG. 1, a pickup truck 10 is shown having a camper body 11 mounted thereon. The pickup truck has a cab area 12, wheels 13, truck sides 14, and a truck bed 15, along with a rear bumper 19. The camper body has a lower or base portion 16 and a telescoping or upper portion 17, which has a camper roof 18 thereon. The telescoping portion 17 has side windows 20 and a rear window glass portion 21 mounted onto a liftable window 22. The base portion 16 has side windows 23 and a pair of tracks 24, which may be elongated in a vertical direction, and may be shaped in a semi-cylindrical cross section. The truck 10 will also have a gate, which has been shown removed in this view. In operation, the telescoping body portion 17 telescopes up into the position shown in FIG. 1, but slides to a lower position for travel. The telescoping portion 17 is guided by the tracks 24 and by grooves 25 formed therein riding on the tracks 24. Advantageously, the raised body 17 allows for standing room on the truck bed 15 when using the camper body 11, but lowering the body 17 to its lower position reduces wind resistance during travel, as well as keeps the body low for traveling through woods and under obstructions.

Figure 2:
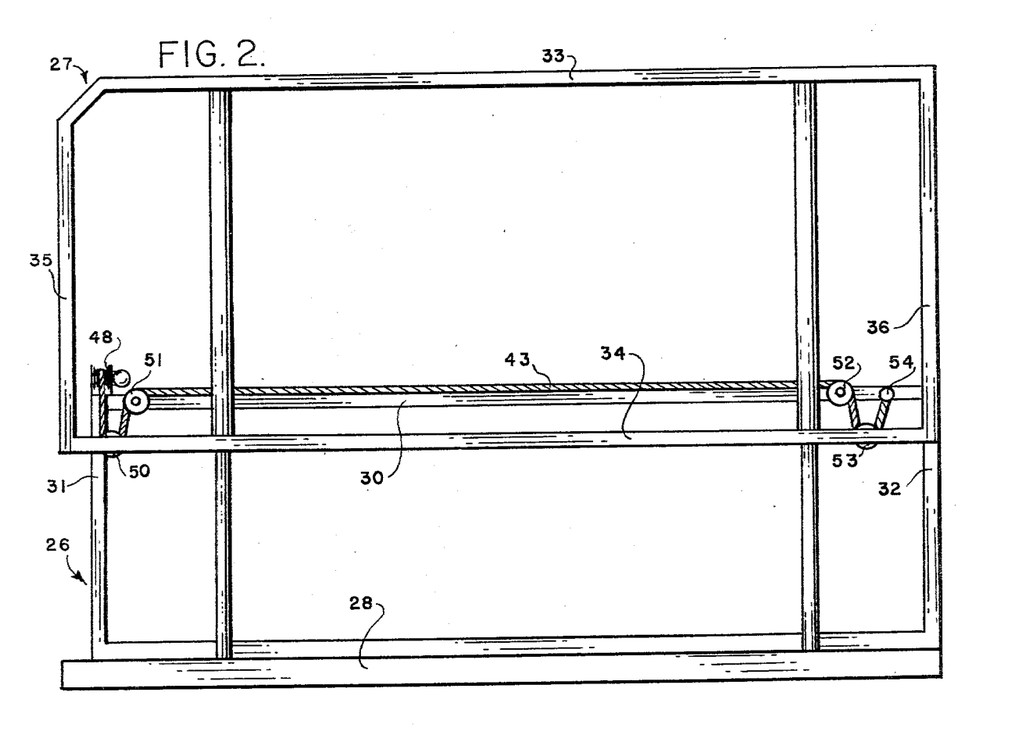
FIG. 2 is a side elevation of the frame having the pulleys and cables shown thereon of a topper body as used in accordance with the embodiment of FIG. 1.
Figure 3:
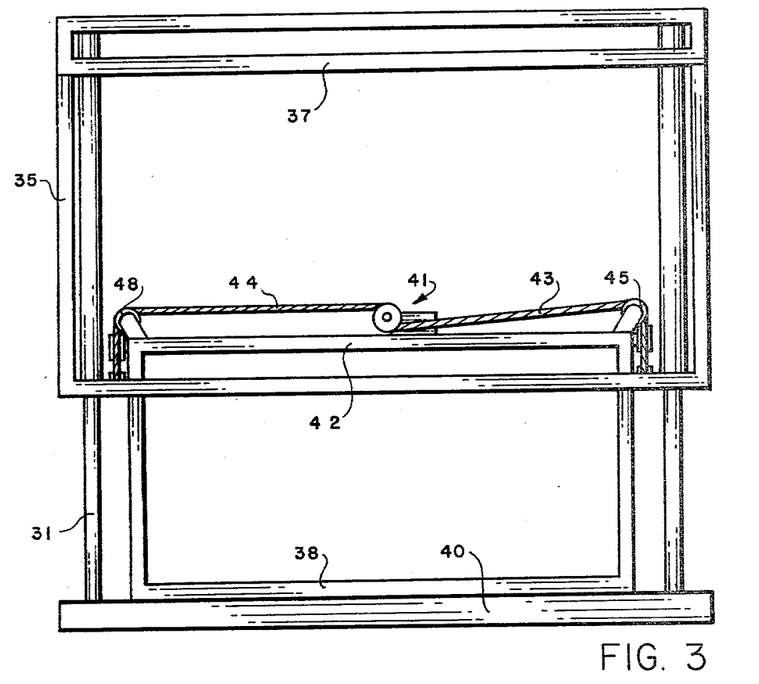
FIG. 3 shows an end elevation of a top telescoping topper frame in accordance with FIG. 2.
Figure 4:
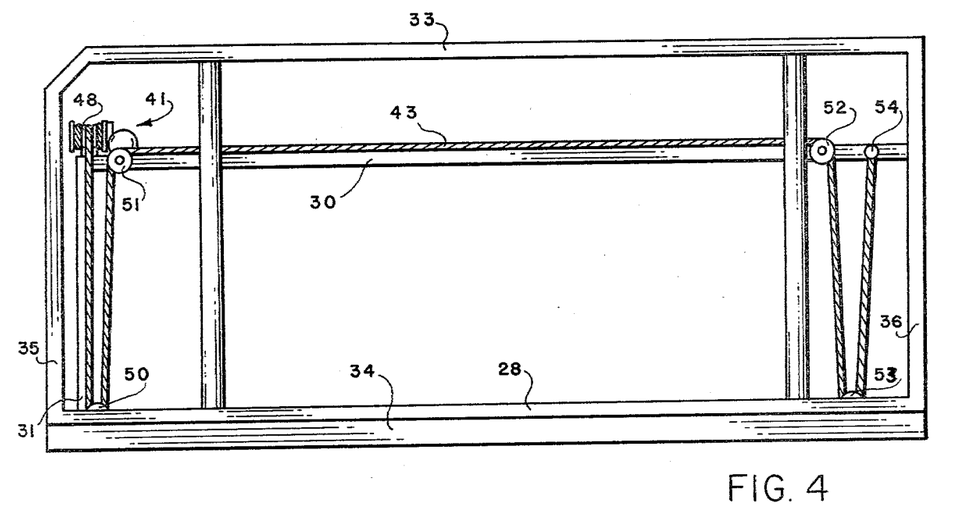
FIG. 4 shows a side elevation of the frame for a topper body in accordance with FIGS. 2 and 3 with the telescoping portion lowered over the base portion.

Turning to FIGS. 2, 3 and 4, the frame for a camper body has been shown with the covering material removed, showing the operation of the telescoping mechanism. A base framework 26 is shown having a telescoping framework 27 telescoping thereover. The base framework has a lower frame portion 28 and a top frame member or portion 30 and a pair of end frame members 31 and 32, while the telescoping frame portion 27 has a top frame member or portion 33 and a bottom or base frame member 34, and a pair of end frame members 35 and 36. The telescoping frame member also has cross frame members 37, while the base frame member has transverse frame members 38 and a cross frame portion 40. Additional frame members can be used as desired to add greater strength depending upon the covering for the frame, which may add sufficient strength not to require any additional bracing members. A winch 41 is attached to a cross frame member 42 of the base frame 26 and has a cable 43 extending out one side and a cable 44 extending off the other side thereof. Cable 43 extends over a rotatably mounted roller or pulley 45 attached to the base frame, while cable 44 extends over a roller 48 attached to the base frame 26. Cable 43 then extends under a roller 50 attached to the telescoping frame 27, and then over a roller 51 attached to the base frame 26. Cable 43 continues along the frame member 30 over a roller 52 attached to frame member 30, then under a roller 53 attached to the bottom of the telescoping frame 27, and is attached to a pin 54 attached to the frame member 30. As can be seen in FIG. 3, pulling the cable on the winch 41 will pull the cable 43 taut, thereby lifting the telescoping frame portion 27 with the rollers 50 and 53. The same arrangement is connected on the opposite side of the frame with cable 44 extending over similar rollers. A slackening up on the winch will allow the cable body to drop, and as can be seen from FIG. 1, the cable body can be guided by guides 24 as it goes up and down, and might typically have internal guide members if desired. As can be seen, as the telescoping portion is raised and lowered, the cables are always hidden from the outside by the cover covering the telescoping framework, while from the inside, the cable is located behind the inside covering for the base portion 26, thereby obscuring the cable and rollers at all times, but at the same time allowing easy access for making corrections to damaged cables or rollers.

Figure 5:
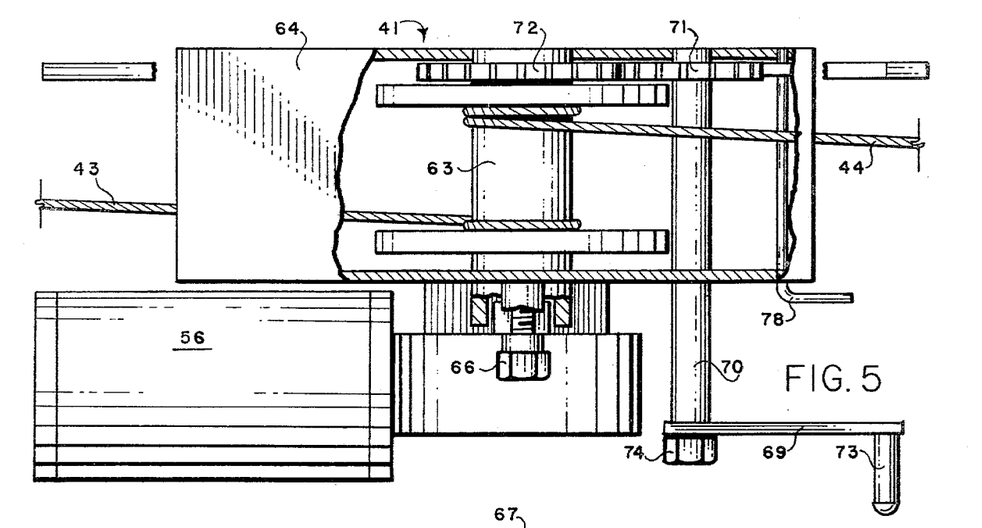
FIG. 5 shows a fragmentary top elevation of a winch for use in the present invention having the motor engaged.
Figure 6:
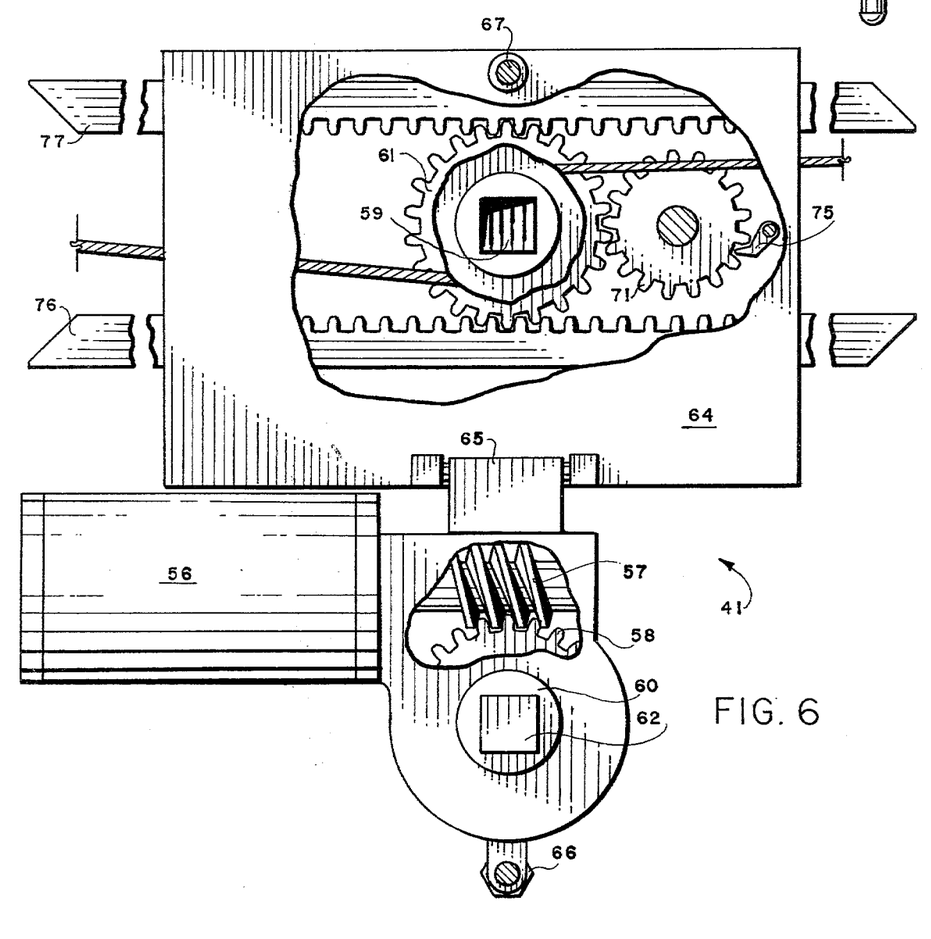
FIG. 6 shows a fragmentary side elevation of a winch in accordance with FIG. 5 having the motor disengaged.

Turning to FIGS. 5 and 6, a simplified winch 41 is illustrated having an electric motor 56 rotatably driving a worm gear 57, which, in turn, is connected to a drive gear 58 fixedly attached to a coupling 60, which in turn is removably coupled to a shaft 61, which rotates a winch drum 63 having the cables 43 and 44 extending therefrom. The coupling 60 has a square headed male coupling member 62 which engages a square receptacle 59 on the winch drum 63. The motor 56 along with gears 57 and 58 and the coupling 62 are hinged on a hinge 65 attached to the frame 64. The winch 41 is mounted to a winch base or frame 64 with the drum 63 riding on bushings in the frame. The motor 56, being hinged at 65 to the frame, allows the coupling 62 to engage and disengage from the drum 63. The coupling 60 has a square male coupling member 62 which removably engages the coupling receptacle 59 on the drum 63. When the motor 56 and coupling are in a connected position, a bolt 66 holds the hinged portion to the frame 64, as shown in FIG. 5, with the bolt threaded into an internally threaded sleeve 67. This winch is easily attached directly to frame member 42 of the base frame 26, and is connected to the battery of the vehicle through an electrical switch, which allows the motor to be driven in a forward or a reverse direction, and switched from the outside of the vehicle with a switch 68.

A manual hand crank 69 is connected to a shaft 70 mounted on the frame 64 and having a gear 71 attached thereto which engages a gear 72 which is fixedly attached to the drum 63. This allows the use of the hand crank 69 having a handle 73 thereon to be used to operate the winch drum 63 to raise and lower the telescoping frame manually. The handle 73 is removably attached with a bolt 74, since the gears 71 and 72 remain engaged at all times, thus preventing the continuous swinging of the handle. Gear 71 has a ratchet pawl 75 mounted adjacent thereto for engaging the teeth of the gear 71 so that the telescoping topper can be latched in any particular position desired by swinging the pawl 75 into and out of engagement with the gear 71. For manual operation, the bolt 66 is loosened and the motor is swung on the hinge 65 to disengage the coupling 62. The hand crank 69 is attached to the shaft 70.

A safety stop mechanism is illustrated having a lower gear rack 76 and an upper gear rack 77, which are driven in opposite directions by the gear 72 which is connected to the winch drum 63. Bottom rack 76 also may have an opening therein for the sliding of a locking pin 78 through the frame 64 to thereby lock the rack in place and prevent the movement of the drum 63, and lock the telescoping body in place. In addition, the racks 76 and 77 have microswitches mounted at each end thereof which disengage the motor 56 when the racks 76 and 77 reach their limits at each end, thereby automatically disconnecting the winch when the topper is fully raised or lowered. A pair of racks may be used as a safety precaution so that the microswitches can be wired in series thereby allowing either rack to disconnect the electric power to the motor 56 after the telescoping body has reached its upper or lower limits. As will be clear to those skilled in the art, a winch has been provided for raising and lowering a telescoping vehicle body which has the features of a simplified disconnect for the electric motor drive for changing to a manual drive, as well as a safety lock and limit switches. Switching the raising and lowering switch on will raise or lower the telescoping vehicle top until it reaches its limits, at which time it will stop.

Figure 7:
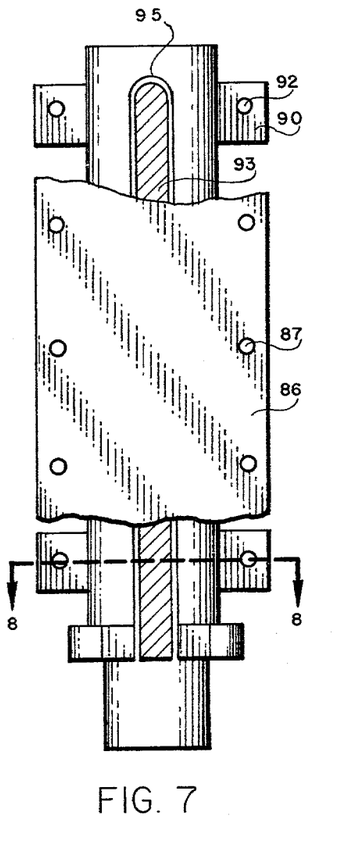
FIG. 7 is a fragmentary side elevation of a telescoping guide for a telescoping vehicle body in accordance with the present invention.
Figure 8:
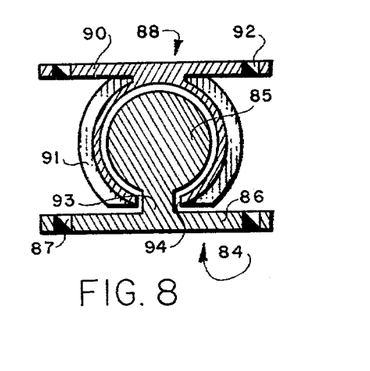
FIG. 8 is a sectional view taken on the line 8—8 of FIG. 7.
Figure 9:
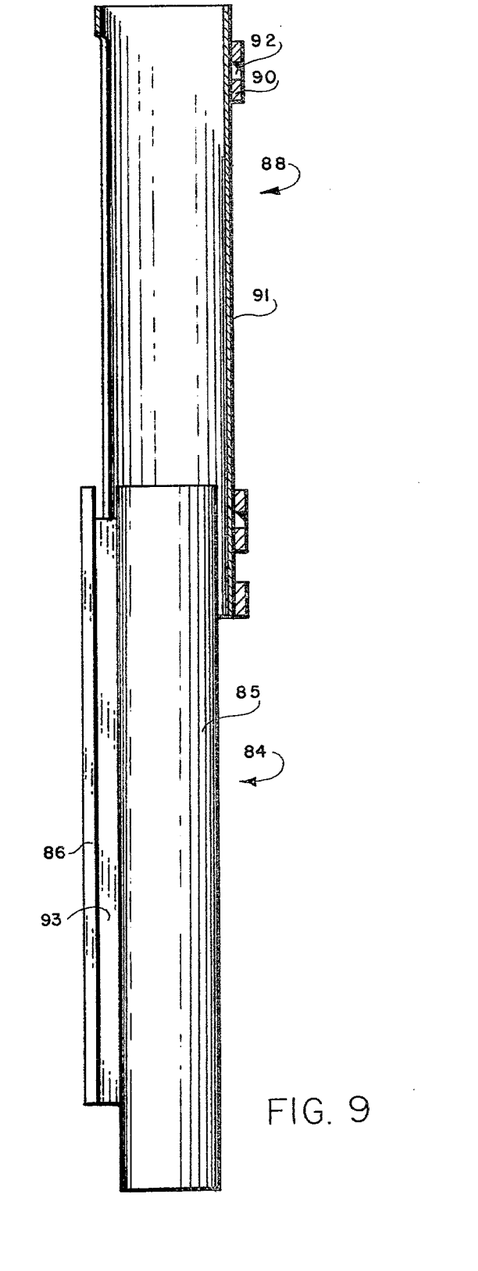
FIG. 9 is a side sectional view of the telescoping guide in FIGS. 7 and 8 in an extended position.

In FIGS. 7 through 9, one embodiment of the vehicle guides illustrated at 24 and 25 in FIG. 1 is illustrated in more detail in which a fixed guide member 84 has a guide bar 85 and a flanged portion 86 having bolt openings 87 for bolting to the base of the vehicle body, while a moving guide member 88 has a flanged portion 90 and a cylindrical portion 91 for sliding over the cylindrical bar 85 and is attached through bolt openings 92 to the telescoping portion of the camper. A neck portion 93 connects the cylindrical bar 85 to the flange 86 and passes through an opening 94 in the hollow cylinder 91. This simple system allows one portion of the guide system to be bolted to the telescoping part of the telescoping vehicle body and the other to be attached to the base portion and for one to slide in the other. The slot 94 has a stop 95 that stops the sliding at the end of the telescoping action.

Figure 10:
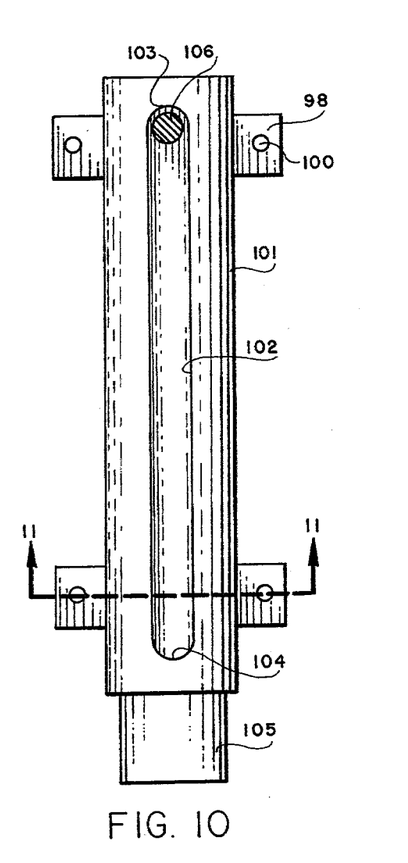
FIG. 10 is an elevational view of a second embodiment of the telescoping guide for a telescoping vehicle body in accordance with the present invention.
Figure 11:
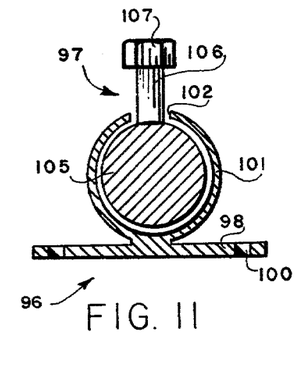
FIG. 11 is a sectional view taken on the line 11—11 of FIG. 10.
Figure 12:
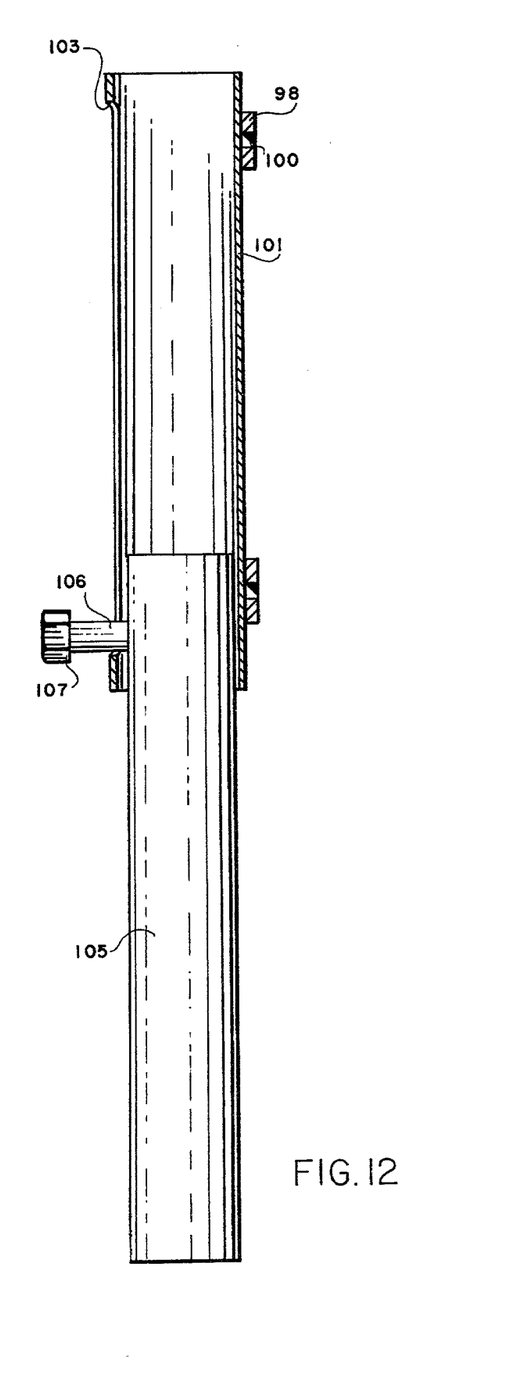
FIG. 12 is a side sectional view of the guide of FIGS. 10 and 11 in an extended position.

An alternate guide system is illustrated in FIGS. 10, 11 and 12, which has the telescoping attachment 96 and the base frame attachment 97 for sliding therein. The telescoping portion 96 has a flange portion 98, bolt holes 100, an elongated cylindrical body 101, having an elongated slot 102 therein, having a stop 103 at one end and a stop 104 at the other end thereof. This is bolted to the telescoping portion of the camper while the fixed portion 97 has a solid cylindrical bar portion 105 having protruding bolt members 106 protruding through the slot 102 and having a nut 107 on the end thereof for bolting this member to the fixed base frame of the telescoping vehicle. This guide portion again simplifies the attachment of the guide members to the camper body during assembly of the body.

Figure 13:
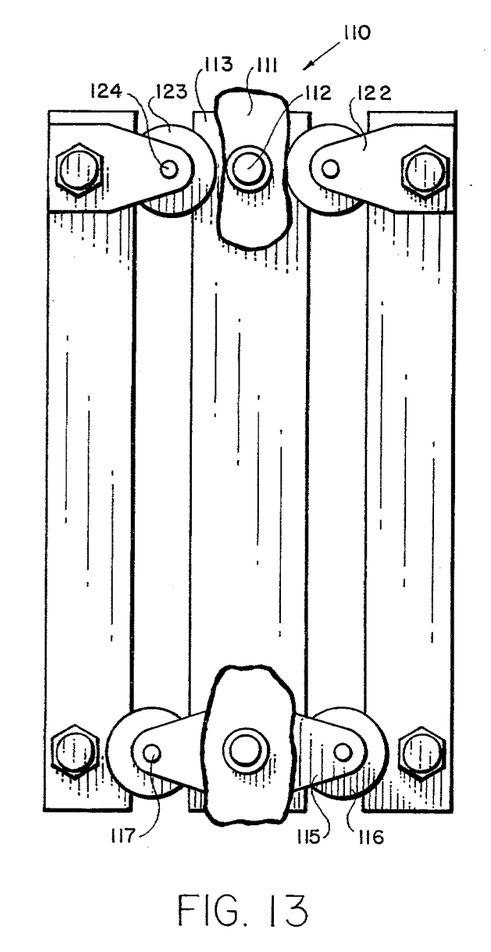
FIG. 13 is a side elevation of a telescoping guide utilizing rollers.
Figure 14:
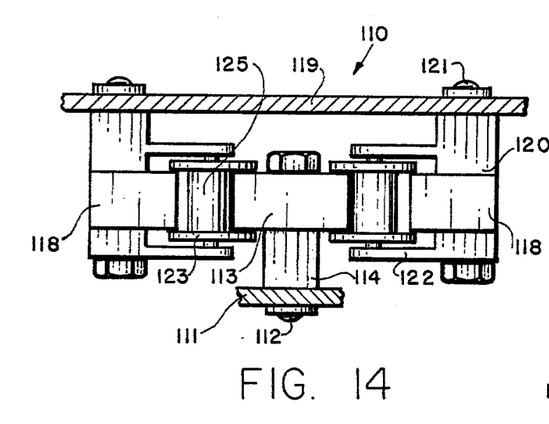
FIG. 14 is an end elevation view taken on the line 14—14 of FIG. 13.
Figure 15:
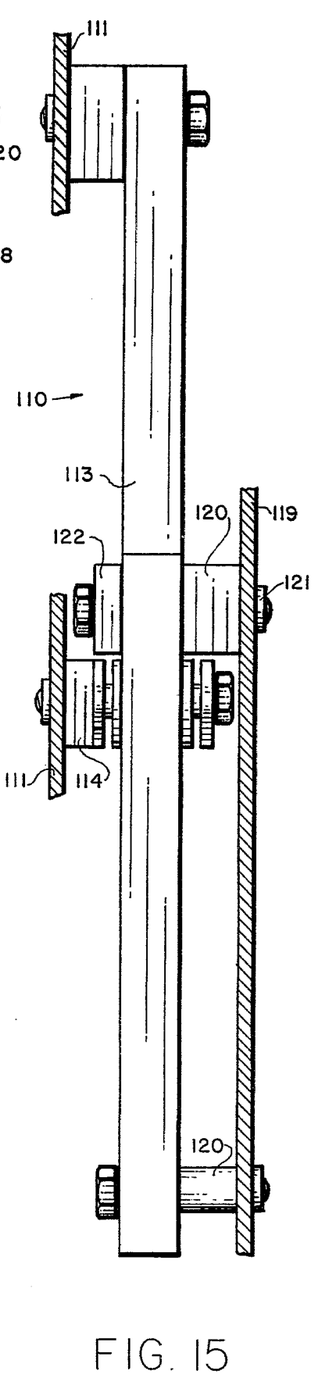
FIG. 15 is a side sectional view of the guide of FIGS. 13 and 14.

Referring now to FIGS. 13, 14 and 15, an additional guide system 110 is illustrated for attachment to a telescoping vehicle body 111 by means of threaded bolts 112 passing through a central sliding track 113 spaced from the body 111 by a spacer 114. The central track member 113 has brackets 115 having rollers 116 thereon riding on shaft 117. The rollers have annular grooves around the periphery thereof for riding over the central member 113 and over track members 118 as illustrated in FIG. 14. The elongated tracks 118 are attached through bolts 121 and spacers 120 to the fixed base portion 119 of the telescoping body, and has brackets 122 supporting rollers 123 on shafts 124. Rollers 123 have annular grooves 125 therein riding on the central track member 113 and also on the guide track portion 118. Thus, the central track member 113 can ride on the rollers 116 riding against track 118 while being supported by the rollers 123. This type of guide system utilizing rollers on both the fixed base portion of the telescoping camper body and the telescoping portion allows the camper body to be raised and lowered in a smoother manner without jamming and maintains the rollers in their tracks.

Figure 16:
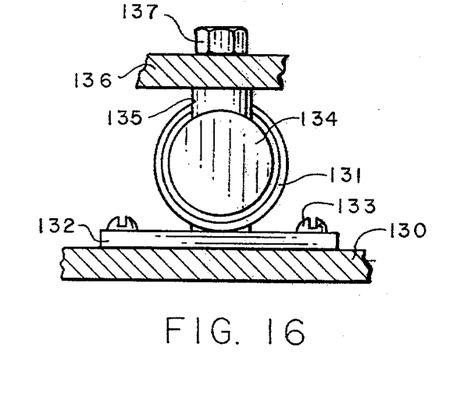
FIG. 16 is a sectional view of another embodiment of a telescoping guide.
Figure 17:
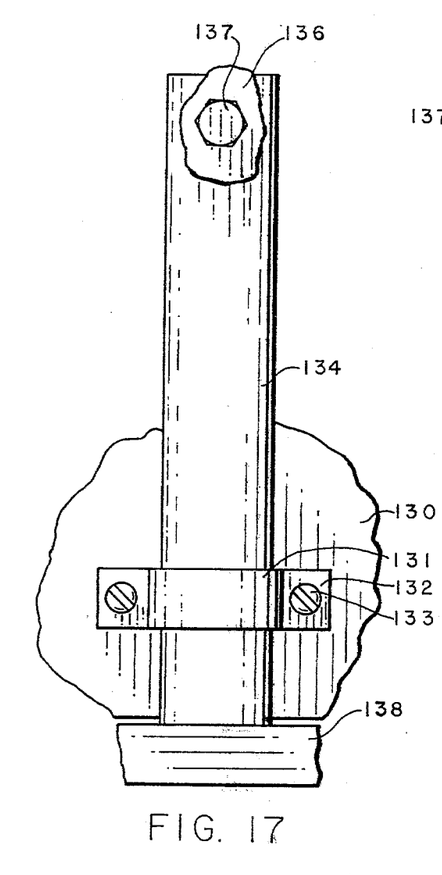
FIG. 17 is a side elevational view of the guide of FIG. 16.
Figure 18:
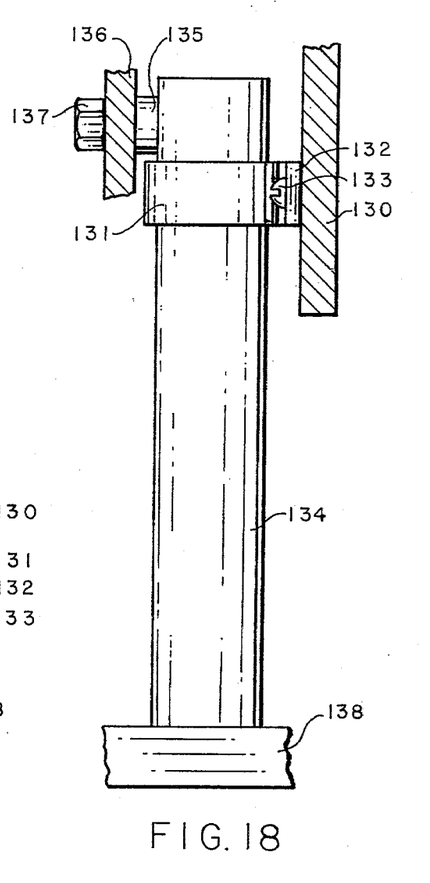
FIG. 18 is a side elevational view of the guide of FIGS. 16 and 17.

Turning to FIGS. 16, 17 and 18, another guide system for guiding the telescoping camper during telescoping is illustrated having a section of the telescoping body 130 connected to a guide sleeve 131 through a base member 132 held to the telescoping body with threaded fasteners 133. The guide sleeve 131 slides on a fixed tubular guide 134 held through spacers 135 to the fixed body portion 136 through a bolt 137. The fixed rod member 134 is also attached to the base 138 of the camper body. This simplified version of a guide system has been found especially effective in preventing the wobble of the telescoping camper body as it moves up and down over the fixed base portion of the body, providing a smoother telescoping action than conventional telescoping guides.

Figure 19:
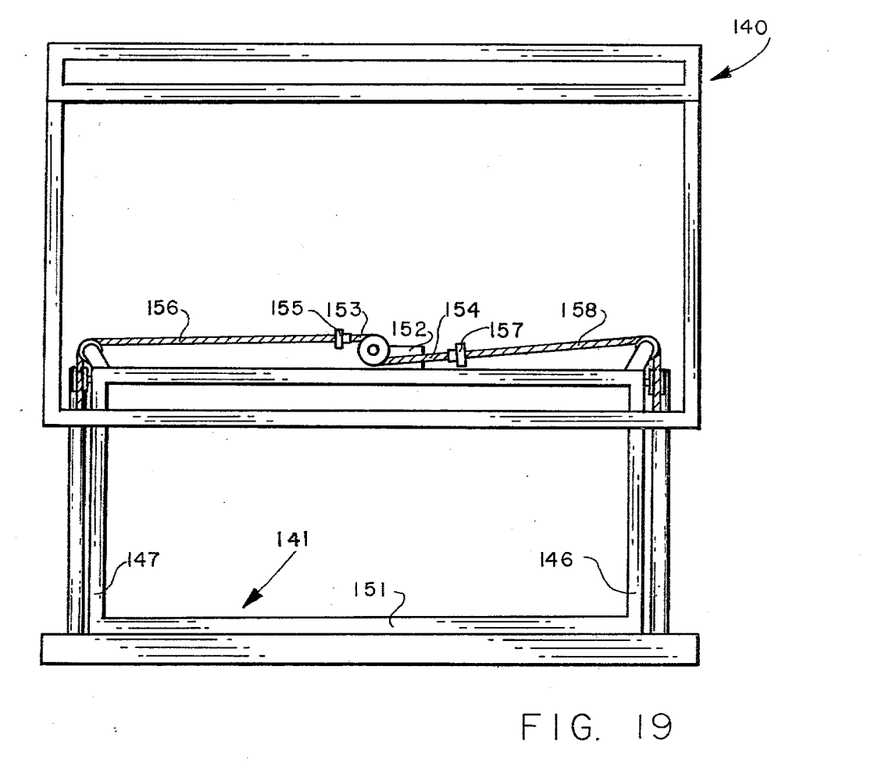
FIG. 19 is an end elevation of a telescoping topper body frame with the winch and cables shown attached thereto.
Figure 20:
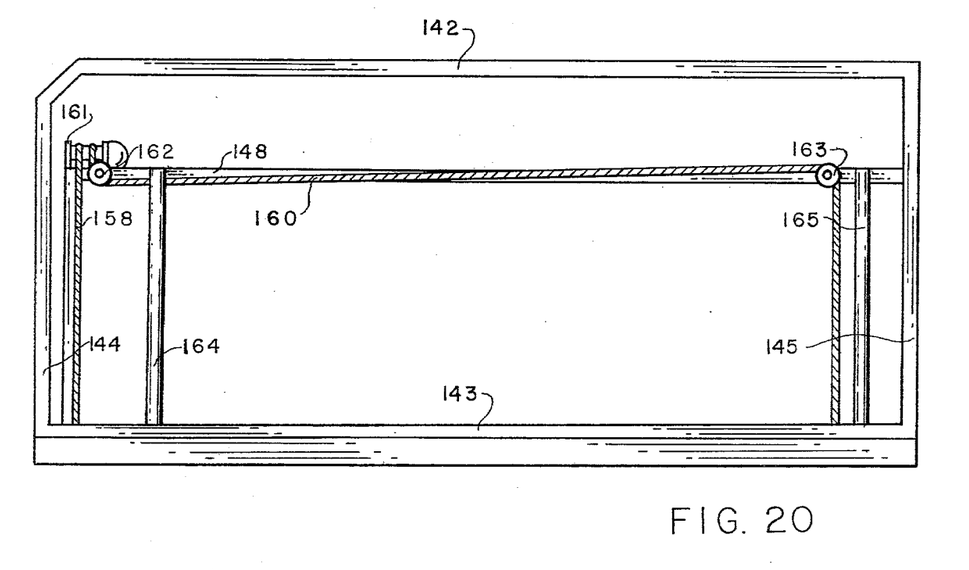
FIG. 20 is a side elevation of the frame of FIG. 19.

In FIGS. 19 and 20, an alternate cable arrangement is illustrated in which a telescoping framework 140 telescopes over a base frame portion 141. The telescoping portion has side frame members 142 and a bottom side frame member 143 and vertically extending end members 144 and 145, while the base portion has vertically extending frame members 146 and 147 and horizontal top frame members 148 and end horizontal top frame member 150 and bottom frame member 151. A winch 152 is mounted to the end frame member 150 and has cables 153 and 154 extending therefrom. Cable 153 has a coupling 155 fixedly attached thereto holding a pair of cables 156, while cable 154 has a coupling 157 holding cables 158 and 160. Cables 158 and 160 extend over a first spool 161 with cable 158 attached to the base frame member 143 of the telescoping frame 140, while cable 160 wraps around a roller 162 and extends horizontally adjacent frame member 148 over a roller 163 attached to the frame member 148. Cable 160 extends vertically from roller 163 where it is attached to the base frame member 143 of the telescoping portion 140. Guide rods 164 and 165 can be seen in this view, which guide rods are similar to those illustrated in connection with the guide means of FIGS. 16 through 18. This lifting cable system used in connection with the guide system of FIGS. 16 through 18 eliminates the problem of the telescoping body tending to wobble its way up the guides, and avoids the more precision adjustment that might be required otherwise.

It should be clear at this point that a telescoping camper body having an improved lifting mechanism and winch has been provided, but it should also be clear that the present invention is not to be construed as limited to the particular forms shown, which are to be considered illustrative rather than restrictive.

I claim:

1. A telescoping vehicle body comprising in combination:
   a base frame having a bottom portion and a top portion;
   a telescoping frame telescoping over said base frame and having a bottom portion and a top portion;
   guide means for guiding said telescoping frame on said base frame during telescoping to a raised or lowered position;
   a lifting winch having an electric motor coupled through gears to a winch drum attached to said base frame and having at least one cable attached thereto, said lifting winch having at least one sliding rack engaging at least one gear for sliding back and forth upon operation of said electric motor in a forward or reverse direction and a microswitch mounted adjacent at least one end for turning off said lifting winch when said rack actuates said microswitch upon said telescoping body reaching an upper or lower limit;

a plurality of rollers fixedly attached to said base frame top portion;

a plurality of rollers attached to said bottom portion of said telescoping frame;

at least one cable attached to said winch and passing over a plurality of rollers on said base frame and under a plurality of rollers attached to said telescoping frame and being attached at one end to said base frame, whereby actuating said winch will pull said cable taut, lifting said telescoping frame on said base frame.

2. A telescoping vehicle body in accordance with claim 1, in which said guide means has a plurality of elongated guide members fixedly attached to said base frame and a plurality of hollow guide members fixedly attached to said telescoping frame and telescoping on said elongated guide members attached to said base frame.

3. The apparatus in accordance with claim 2, in which said elongated hollow guide members attached to said base frame have a neck extending therefrom attached to a flange for bolting to said base frame.

4. The apparatus in accordance with claim 3, in which said elongated hollow guide members attached to said telescoping frame each have a tangential flange extending therefrom for attaching to said telescoping frame.

5. The apparatus in accordance with claim 1, in which said guide means has an elongated hollow guide member having an elongated slot therein attached to said telescoping frame and an elongated telescoping guide member having at least one bolt fixedly attached thereto and extending therefrom and bolted to said base frame and sliding in said elongated slot in said hollow guide member attached to said telescoping frame.

6. The apparatus in accordance with claim 5, in which said elongated hollow guide member has a plurality of flange members extending tangentially thereto and having apertures therein for attaching to said telescoping frame.

7. A telescoping vehicle body in accordance with claim 1, in which said plurality of rollers fixedly attached to said base frame top portion includes two rollers for each coacting roller attached to said bottom portion of said telescoping frame and mounted to align each said roller on said telescoping frame between said pair of rollers.

8. The apparatus in accordance with claim 7, in which said winch has two cables attached thereto, one extending on each side of said base frame, and each end being attached to a roller attached to said base frame.

9. The apparatus in accordance with claim 8, in which said base frame and telescoping frame each have an exterior surface mounted thereover.

10. An apparatus in accordance with claim 9, in which said telescoping vehicle body is a telescoping topper attached to a truck and has an electrical switch mounted on the exterior thereof operatively connected to said winch for actuating said winch to telescope said vehicle body.

11. The apparatus in accordance with claim 10, in which said exterior switch is a key switch.

12. The apparatus in accordance with claim 1, in which said lifting winch has gears which can be disengaged from said electric motor for manual operation.

13. The apparatus in accordance with claim 12, in which said lifting winch has a removable handle for hand actuating said winch when said gears are disengaged for manual operation.

14. The apparatus in accordance with claim 1, in which said lifting winch has a pair of gear racks, one engaging the top and one engaging the bottom of a drive gear for actuating a microswitch on both ends at the end of the travel of the telescoping vehicle body upon each rack engaging a microswitch.

15. A telescoping vehicle body comprising in combination:

a vehicle body base attached to a vehicle and having a bottom portion and a top portion thereof;

a telescoping body telescoping over said base body and having a bottom portion and a top portion thereof;

telescoping guide means having a plurality of elongated fixed portions attached to said vehicle body base and a plurality of telescoping portions fixedly attached to said telescoping body for telescoping in said fixed portion on said body base for guiding said telescoping body portion during telescoping on said vehicle body base, said telescoping guide means fixed portions having a plurality of rollers mounted thereto and said plurality of telescoping portions each having a track with said elongated fixed portion rollers riding thereon and said telescoping portions each having a plurality of rollers riding on an elongated fixed portion track, whereby said telescoping guide means is prevented from binding during the telescoping of said vehicle body, and each outside elongated fixed portion roller having an annular grooved portion therearound for engaging said telescoping portion track and each of said telescoping portion rollers has a grooved portion therearound for engaging said fixed portion track;

winch means attached to said vehicle body base and having a pair of cables extending therefrom; and each cable extending on one side of said telescoping vehicle body over one roller of each pair of rollers attached to said body base, under a coacting roller on said telescoping body base, each said cable being fixedly attached at the end thereof to said body base whereby actuation of said winch will pull said cable taut lifting said telescoping body on said body base.

16. A telescoping vehicle body comprising in combination:

a base frame having a bottom portion and a top portion;

a telescoping frame telescoping over said base frame and having a bottom portion and top portion;

guide means for guiding said telescoping frame on said base frame during telescoping to a raised or lowered position;

a lifting winch attached to said base frame and having a spool having cables extending in two directions therefrom, said winch having a winch frame having a spool rotatably mounted thereon, and an electric motor driving a gear box hinged to said winch frame for driving said winch spool;

a pair of cable coupling means, one attached to each cable extending from said lifting winch spool and each coupling means having a pair of cables attached thereto;

a pair of double cable rollers fixedly attached to said base frame top portion, each having one pair of said cables extending thereover, one said cable extending thereover being attached to the bottom portion of said telescoping frame; and a plurality of rollers attached to said base frame top portion, and said other cable of each said pair of cables extending over one said double cable roller extending over a second roller and being attached to the bottom portion of said telescoping frame, whereby actuating said winch will raise and lower said telescoping frame.

17. A telescoping vehicle body in accordance with claim 16, in which said guide means has a plurality of guide rods attached to said base frame and a plurality of sleeves attached to said telescoping frame and one sleeve slidably attached to each guide rod, whereby said telescoping frame is guided during raising and lowering of said telescoping frame.

18. The apparatus in accordance with claim 17, in which said winch includes a coupling means for removably coupling said electric motor and gear box to said spool of said winch.

19. The apparatus in accordance with claim 18, in which said winch coupling means includes latching means for latching said gear box adjacent said frame at one end of said winch spool in one position and for disengaging and swinging said motor and gear box on a hinged connection to said frame to a second position for disengaging said electric motor from said winch spool.

20. The apparatus in accordance with claim 19, in which a hand crank is removably attachable to actuate said winch spool.

* * * * *